United States Patent
Stamm

[15] 3,671,049
[45] June 20, 1972

[54] FRICTION WELDING APPARATUS

[72] Inventor: Alex F. Stamm, Rochester, Mich.

[73] Assignee: North American Rockwell Corporation, Pittsburgh, Pa.

[22] Filed: Oct. 1, 1970

[21] Appl. No.: 77,208

Related U.S. Application Data

[62] Division of Ser. No. 650,505, June 30, 1967, Pat. No. 3,575,334.

[52] U.S. Cl..........................279/4, 228/2, 308/9, 308/DIG. 13
[51] Int. Cl..................B23b 31/30, F16c 7/04, B23k 27/00
[58] Field of Search............279/4; 308/9, DIG. 1, DIG. 13; 228/2

[56] References Cited

UNITED STATES PATENTS 3,223,463  12/1965  Porath........................................308/9

Primary Examiner—Francis S. Husar
Attorney—George R. Powers and John R. Bronaugh

[57] ABSTRACT

A friction welding apparatus is particularly adapted for the friction welding of relatively heavy workpieces, as for example the center section and wheel bearing end spindles of a drive axle housing, and comprises special hydrostatic bearing equipped devices for mounting the rotating workpieces. Each such device is mounted for axial displacement and comprises a rotatable arbor assembly to which the rotatable workpiece, such as a wheel bearing end spindle, is clutched and the arbor assembly is rotatably supported in a housing by two axially spaced hydrostatic journal bearings. Front and rear hydrostatic thrust bearings are provided between the arbor assembly and the housing. Oil under suitable pressure is supplied to both the journal and thrust hydrostatic bearings, and controls are provided for attaining and maintaining suitable fluid pressure levels at these bearings. One aspect of control insures that the workpiece is not secured to the arbor assembly until journal bearing oil pressure reaches a certain level. Oil is forced under high pressure into the bearings through specially arranged passages and after being discharged from the hydrostatic bearings returns to a sump at lowered pressure.

10 Claims, 10 Drawing Figures

INVENTOR.
ALEX F. STAMM

INVENTOR.
ALEX F. STAMM

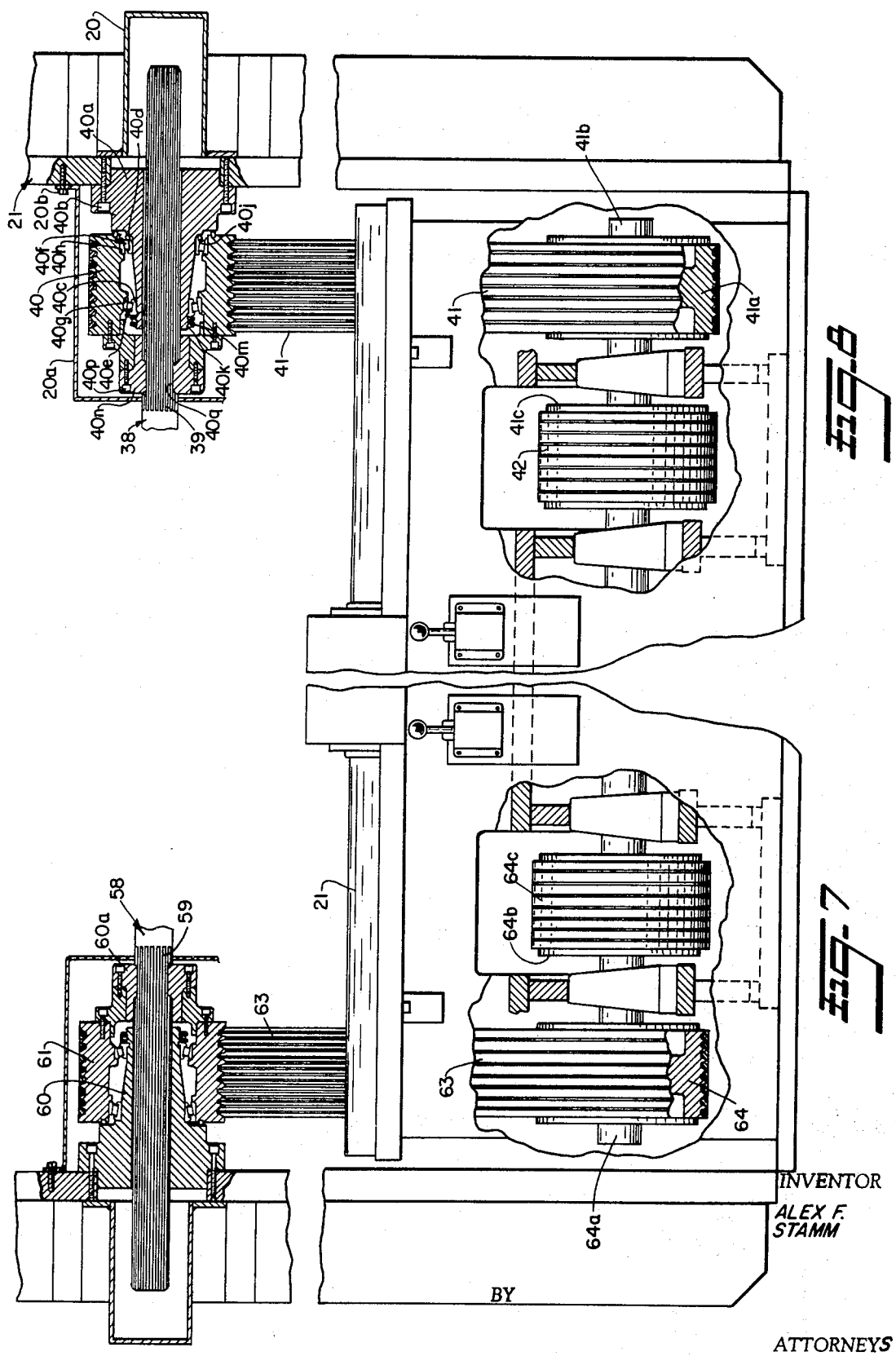

FRICTION WELDING APPARATUS

This is a division of copending application Ser. No. 650,505, filed June 30, 1967 and now U.S. Pat. No. 3,575,334.

BACKGROUND AND SUMMARY OF INVENTION

The friction welding of relatively lightweight parts is well known, and apparatus has been proposed wherein relatively rotating parts such as thin metal shells and the like are forced into rubbing contact until the generated heat due to friction results in fusion of the engaged regions and subsequent friction welding. While there has been some academic mention of friction welding together of relatively heavy parts as in literature, it is apparent that the writers have not had the practical experience to appreciate the bearing requirements necessitated when very heavy metal masses such as steel drive axle housing components are brought together into relatively rotating frictional engagement.

Standardized methods of design of machinery for such heavy duty friction welding lead to the conclusion that the extremely heavy radial bearing loads to be encountered require relatively large cumbersome and expensive conventional type journal bearings, and there has been no real evaluation of the nature of heavy duty thrust bearings which would be adequate except to realize that such bearings would have to be very large and complex.

The invention solves these problems of space and adequacy by incorporating hydrostatic bearings in combination into the machine, and this is the major object of the invention.

A further object of the invention is to provide a hydrostatic bearing unit of entirely novel construction having a rotatable arbor assembly adapted to be clutched to a workpiece to be rotated and advanced into friction welding engagement with a stationary workpiece, the arbor assembly being radially supported on axially spaced hydrostatic journal bearings in a housing and having front and rear hydrostatic thrust bearing supports in the housing. More detailed objects of the invention include in combination special oil passage arrangements to the respective bearings, a control system for oil flow and pressure, and the incorporation in the arbor assembly of a fluid pressure responsive piston actuating the workpiece attachment clutch.

While hydrostatic bearings per se are known and used, the invention represents a novel arrangement thereof and in combination with other components of the friction welding apparatus, as will appear.

BRIEF DESCRIPTION OF DRAWINGS

FIG. 3A is an enlarged fragmentary view illustrating the orifice construction for delivering oil to the front thrust bearing shown in FIG. 3;

FIG. 7 is an enlarged fragmentary elevation of the outboard end of the left-hand bearing unit and illustrates details of the belt and pulley motor-driven connection for rotating a workpiece carried by the unit; and FIG. 8 is an elevation similar to FIG. 7 and illustrating the outboard end of the right-hand unit of FIG. 1.

PREFERRED EMBODIMENTS

Figure 1:
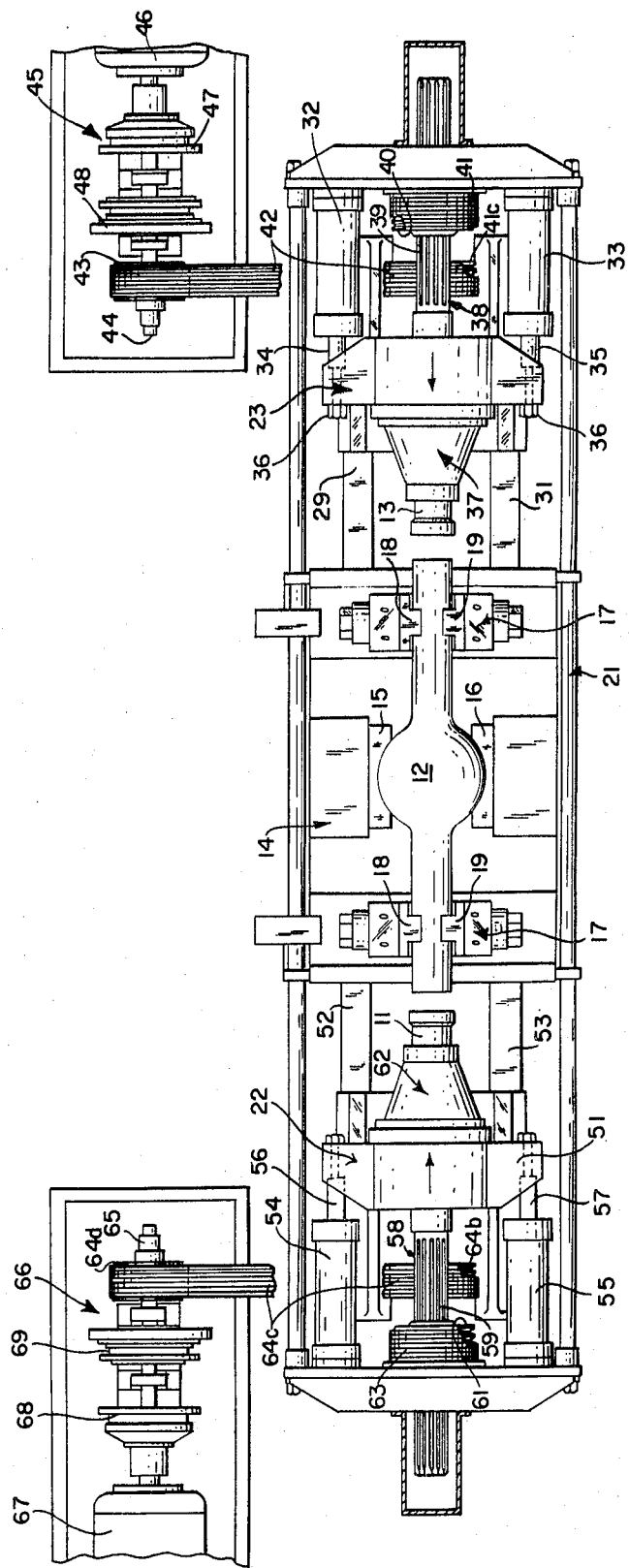
FIG. 1 is a top plan view illustrating the arrangement of parts in apparatus incorporating a preferred embodiment of the invention.

FIG. 1 illustrates a friction welding apparatus wherein three workpieces 11, 12 and 13 are adapted to be friction welded together. In this arrangement the central workpiece 12, which may be an axle housing center section, is held stationary and the other two workpieces, which may be wheel bearing end spindles 11 and 13, are rotated while being moved into contact with opposite ends of workpiece 12.

The central workpiece 12 is mounted in a cradle structure 14 wherein opposite sides are engaged and held suitably by adjustable jaws 15 and 16. The oppositely extending arms of workpiece 12 are clamped tightly in similar fixtures 17 each of which has opposed adjustable jaws indicated at 18 and 19 for gripping the workpiece. This arrangement supports and anchors workpiece 12 against rotation or axial displacement. Cradle 14 is secured rigidly to the machine base 21 during operation.

Workpiece 11 is mounted upon a hydrostatic bearing unit carrier 22 and workpiece 13 is mounted upon a similar hydrostatic bearing unit carrier 23 at opposite ends of base 21. These carriers 22 and 23 and the bearing units on them are essentially the same.

Figure 2:
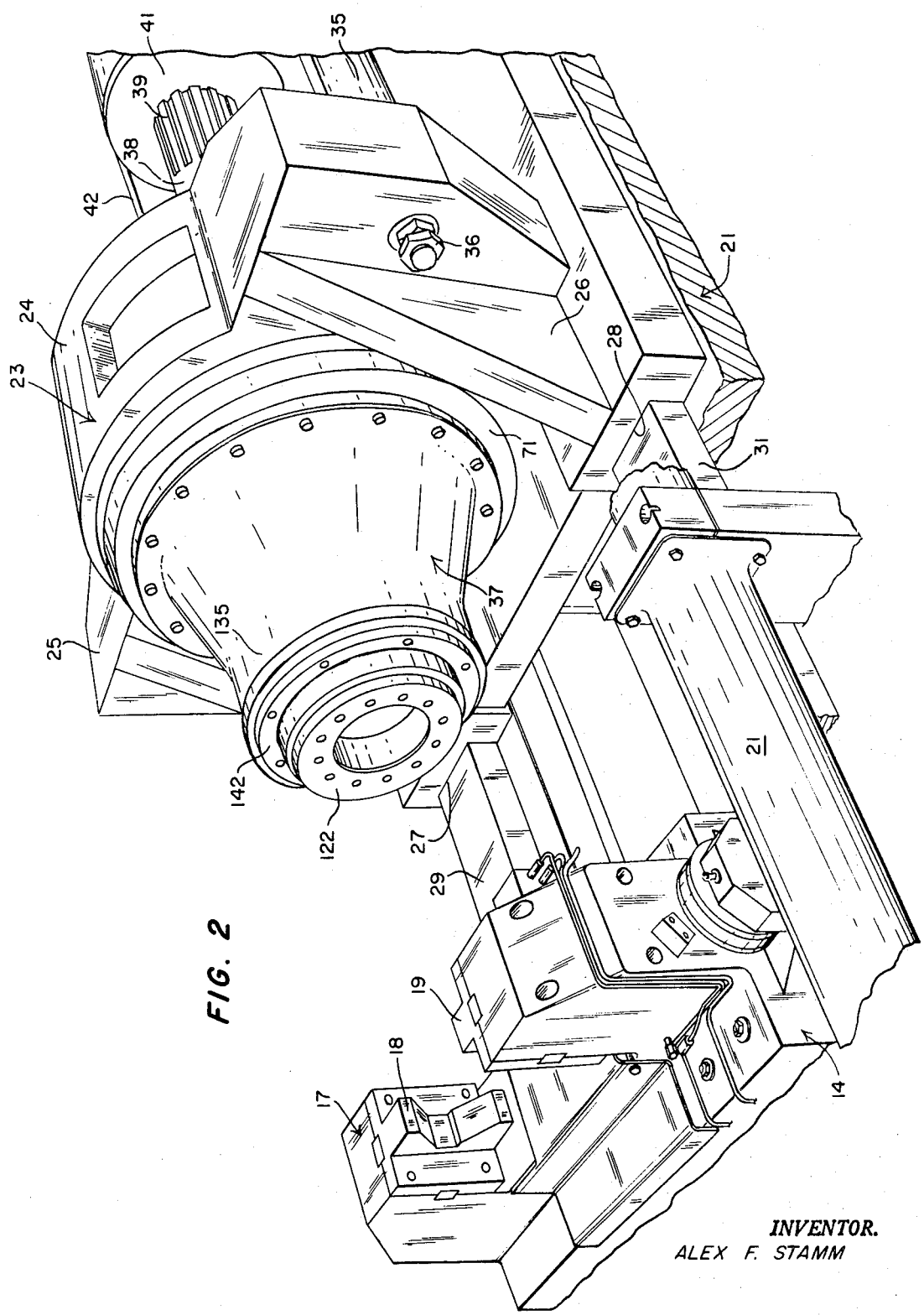
FIG. 2 is a generally perspective view showing a hydrostatic bearing unit from the apparatus of FIG. 1.

FIG. 2 shows carrier 23 as comprising an annular frame 24 having rigid side members 25 and 26 formed at their lower ends with parallel rectangular guideway grooves 27 and 28 respectively slidably fitting with parallel rails 29 and 31 on the machine base 21.

A pair of power cylinders 32 and 33 are fixed on base 21 with their piston rods 34 and 35 respectively projecting parallel and at the same level into rigid connection with carrier frame 24. Fasteners such as nuts 36 assure that piston rods 34 and 35 are unitarily secured to frame 24. As will appear introduction of fluid under pressure into both cylinders 32 and 33 will advance the carrier and the bearing unit cartridge 37 thereon toward the stationary workpiece 12.

A shaft 38, located centrally of carrier 23 and midway between cylinders 32 and 33, has a splined section 39 which axially slidably but non-rotatably extends through the hub of an axially stationary pulley 40 (see FIG. 8). A belt 41 connects pulley 40 to a pulley 41a fixedly mounted on an idler shaft 41b that is suitably journalled for rotation about an axis extending parallel to and vertically below shaft 38. A pulley 41c is also fixedly mounted on shaft 41b and a belt 42 (FIG. 1) connects pulley 41c to a pulley 43 on the output shaft 44 of a power assembly 45 consisting essentially of an electric motor 46 connected to shaft 44 through a clutch unit at 47 and having a braking unit associated therewith at 48.

Referring to FIG. 8, a sleeve or spindle 40a secured to the machine frame as by screws 40b and coaxially surrounds shaft 38 so as to permit free sliding of the shaft therethrough. Sleeve 40a is formed with axially spaced cylindrical sections 40c and 40d on which are mounted the inner races of tapered roller bearing units 40e and 40f respectively. The outer races of the bearing units axially abut internal annular shoulders 40g and 40h respectively of pulley 40. The outer end of the internal race of bearing unit 40f abuts axial shoulder 40j on the sleeve. The outer end of the sleeve is threaded at 40k to mount a locknut assembly 40m which abuts the outer end of the inner race of bearing unit 40e. When the locknut assembly is tightened the bearings are preloaded and retained, and as shown these bearing units 40e and 40f also act as thrust bearings for preventing axial displacement of pulley 40 with respect to shaft 38.

An axially aligned drive collar 40n is secured to pulley 40 as by screws 40p and has an internally splined hub 40q meshed with shaft splines 39. Shaft 38, during operation when the carrier 23 is displaced along the frame, slides axially through collar 40n while retaining drive between shaft 38 and pulley 40 without axial displacement of the pulley.

Shaft 38 enters the hydrostatic bearing unit cartridge 37 wherein as will appear it may be operably drive connected to the inserted workpiece 13. By confining pulley 40 against axial displacement and by providing the splined drive connection between pulley 40 and shaft 38, continuous rotation of shaft 38 need not be interrupted as the carrier for the cartridge is axially displaced along guide rails 39 and 31.

As shown in FIG. 8 a tubular enclosure 20 extends from the frame to enclose the splined end of shaft 38 during displacement, and a suitable sheet metal cover 20a secured to the frame as by screws 20b extends over the upper part of the pulley.

The foregoing drive structure is essentially duplicated for driving pulley 61 at the other end of the support structure.

Housing carrier 22, like carrier 23, is slidably mounted on the machine frame guide rails 52 and 53 which are in parallel alignment with rails 29 and 31, and displacement of carrier 22 is controlled by parallel cylinders 54 and 55 connected by piston rods 56 and 57 respectively to housing 51. A shaft 58 having a splined section 59 axially slidably extending through a pulley 61 extends into the bearing unit cartridge 62 to be connected, as will appear, to rotate workpiece 11.

Pulley 61 is rotatably mounted and confined against axial displacement on a fixed sleeve 60 in the same manner that pulley 40 is mounted on sleeve 40a. Pulley 61 is non-rotatably drive connected to shaft 58 through the splined drive connection provided by section 59 and drive collar 60a. Shaft splines 59 are slidable through the splined hub of collar 60a during operation so that drive to the pulley is not interrupted as carrier 62 moves along the support structure. Pulley 61 is connected by belt 63 to an idler pulley 64. Pulley 64 is mounted on an idler shaft 64a which is suitably journalled for rotation about an axis extending parallel to and vertically below shaft 58. A further pulley 64b, which is mounted on shaft 64a, is connected by a belt 64c to a pulley 64d. Pulley 64d is mounted on an output shaft 65 of an independent power unit 66 that comprises an electric motor 67 connected to shaft 65 through a clutch 68 and having a braking unit associated therewith at 69.

Figure 3:
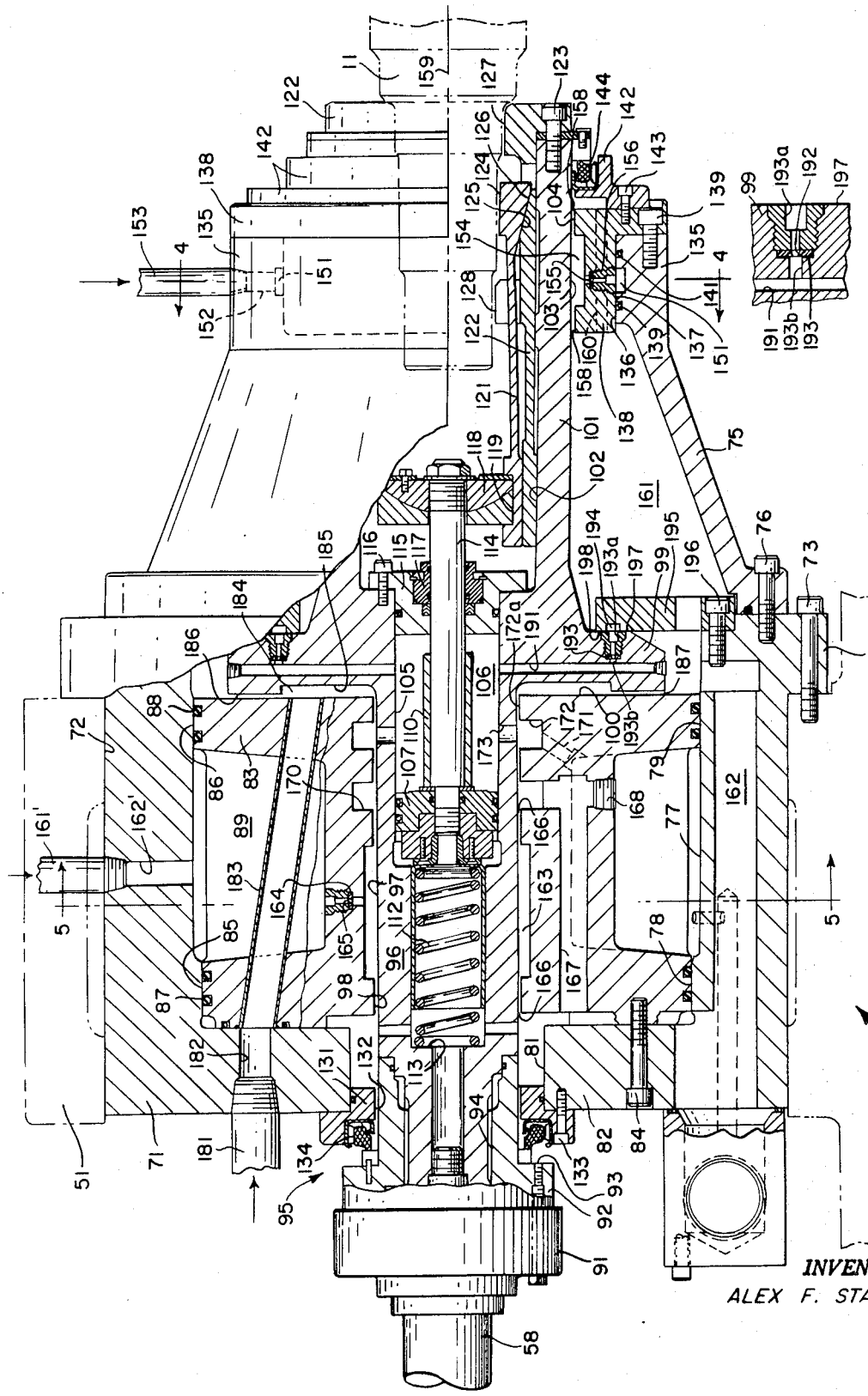
FIG. 3 is a side elevation view, partially in section showing structural details of the unit of FIG. 2.

The hydrostatic bearing unit cartridges 37 and 62 are preferably exactly alike, and similar reference numerals will be used for both. FIG. 3 shows internal details wherein the cartridge unit comprises a housing 71 that has a cylindrical periphery fitted snugly within the inner periphery 72 of frame 51. A series of machine screws 73 extend through a radial housing flange 74 to fix housing 71 to frame 51. A forwardly extending hollow conical nose portion 75 of the housing is secured to the housing by a row of screws 76 at flange 74.

Housing 71 is formed with a forwardly open relatively large diameter recess 77, and recess 77 is provided front and rear with axially spaced concentric cylindrical surfaces 78 and 79, surface 78 near the bottom of the recess being of slightly smaller diameter. Concentric with recess 77 is a smaller diameter bore 81 through rear wall 82 of the housing.

Within recess 77 a housing core section 83 is secured as by a series of machine screws 84 extending through wall 82. Core 83 is formed with cylindrical end surfaces 85 and 86 fitting snugly with recess surfaces 78 and 79 respectively, and resilient seal ring and groove arrangements indicated at 87 and 88 respectively provide static seals, whereby interiorly of the housing 71 an annular chamber 89 is defined between core 83 and the surrounding housing portion.

As will appear core 83 is formed with special lubricant distribution passages. It is preferably made as a physically separate part from the housing to permit the forming therein of such passages without unduly complex casting or machining operations, but once in place as shown in FIG. 3 it becomes essentially a unitary part of housing 71.

Power driven shaft 58 is connected to a coupling 91 which is secured to the end of a drive sleeve 92 by bolts 93. Sleeve 92 is non-rotatably mounted, as by splines at 94, on the end of a hollow arbor assembly 95. Arbor assembly 95 comprises a rear section 96 having a cylindrical surface 97 passing through a surrounding cylindrical bore 98 in core 83, a radially enlarged flange section 99 adjacent the flat front core face 100 which is perpendicular to the arbor axis, and a forward section 101 having an internal cylindrical bore 102 and an outer cylindrical periphery 103 surrounded by a cylindrical bore 104 on the front end of the housing nose 75.

As will appear the arbor assembly is radially supported within the housing on hydrostatic bearing means effective between arbor section 96 and bore 98 and between arbor section 101 and bore 104.

Arbor section 96 is enlarged internally at 105 to form a cylinder chamber 106 within which a piston 107 is slidably mounted. A compression spring 112 reacts between a radial wall 113 within the arbor and piston 107 to urge the piston to the right in FIG. 3.

A piston rod 114 fixed to piston 107 extends slidably through a cap 115 secured as by screws 116 to the flange section of the arbor to otherwise close the forward end of chamber 106. A suitable sealed bearing assembly indicated at 117 permits free sliding of rod 114 while maintaining fluid pressure in chamber 106. A spacer sleeve 110 on rod 114 limits forward displacement of piston 107.

At its forward end piston rod 114 is secured to a swivel coupling 118 peripherally engaged in internal annular grooves 119 on the rear end of a series of chuck elements 121 which in turn are axially slidably mounted on a chuck element 122 fixed as by screws 123 upon the arbor assembly. There are usually several chuck elements 121 equally circumferentially distributed about the workpiece.

The forward end of each chuck element 121 has an inner workpiece engaging surface 124 and an external generally conical contour forward inclined surface 125 that slidably engages a similarly inclined surface 126 on fixed clutch element 122. Fixed clutch element 122 has an internal annular workpiece engaging surface at 127, and a series of circumferentially spaced internal workpiece engaging surfaces 128 between which extend the movable chuck elements 121.

The chuck arrangement and structure shown in FIG. 3 is for holding axle spindles of the shape illustrated. The invention contemplates any equivalent chuck arrangement suited to the workpieces being welded.

In FIG. 3, piston 107 is shown displaced to its rearmost position by fluid pressure in chamber 106, and in that position it has displaced chuck elements 121 to the left whereby they ride up cam surfaces 126 to contract the chuck and peripherally grip workpiece 11 to lock it non-rotatably to the arbor assembly 95 concentrically on the axis of rotation of the arbor assembly. This condition exists during the friction welding operation as will appear.

The rear end of housing bore 81 contains a ring 131 the internal periphery 132 of which has free running clearance with the arbor. Collar 131 is secured to the housing as by screws 133 and mounts an annular axially resilient seal assembly 134 axially disposed between the stationary housing and the rotating arbor assembly. Thus no lubricant can escape axially through housing bore 81.

At the front end of the cartridge, housing member 75 terminates in boss 135 having a cylindrical bore 136 snugly receiving the cylindrical surface 137 of a bearing collar 138 secured to the housing as by screws 139. Bore 104 is formed on the inner periphery of collar 138. Static seal rings 139 and 141 are provided between surfaces 136 and 137.

At its forward end a ring 142 secured to collar 138 as by screws 143 mounts an axially resilient seal assembly 144 axially disposed between the stationary housing structure and the rotating arbor assembly. Thus no lubricant can escape through the front end of the housing.

Seals 134 and 144 are the only two seals needed between the arbor assembly and the housing in the novel structure of the invention.

Figure 4:
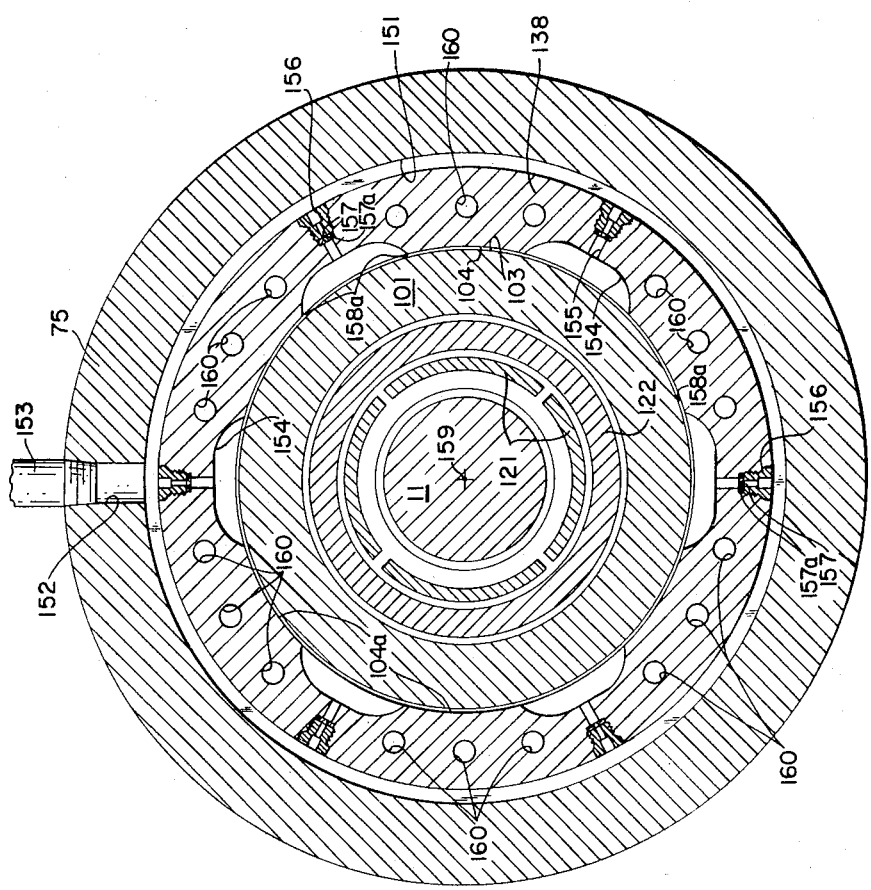
FIG. 4 is a sectional view substantially along line 4—4 of FIG. 3.
Figure 4A:
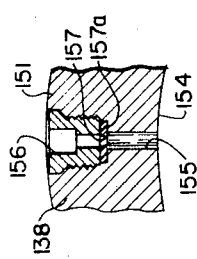
FIG. 4A is an enlarged fragmentary view of one of the journal bearing oil supply orifice structures shown in FIG. 4.

An annular groove 151 is provided in surface 136 axially between the seal rings 139 and 141, and a radial inlet passage 152 extends outwardly from this groove to connect with a supply conduit 153. Referring to FIGS. 3 and 4, it will be seen that the internal surface 104 of bearing collar 138 is formed with an equally circumferentially spaced series of cavities 154 of the same size, and each cavity is connected to groove 151 by a radial passage 155 containing a sharp-edged calibrated, flow restricting orifice 157 of predetermined size. Each orifice 157, as best shown in FIG. 4A, is defined by a thin orifice disc 157a which is held in place within a diametrically enlarged section of passage 155 by an annular fitting 156. Fitting 156 is threaded into the enlarged section of passage 155 as shown.

The diameter of cylindrical surface 104 is accurately machined a small amount larger than the diameter of cylindrical arbor surface 103.

Oil under high pressure enters passage 152 and distributes circumferentially around groove 151 from whence it is directed into cavities 154 through the restricted orifices 157. Cavities 154 therefore are filled with the oil at a lower pressure than the supply pressure, and the difference in diameters of surfaces 103 and 104 provides gaps indicated at 158 (FIG. 3) and 158a (FIG. 4). Gaps 158a are delimited by the portions of surfaces 104 indicated at 104a and extend circumferentially between the adjacent cavities. Normally no oil flows through gaps 158a because the pressure of oil in adjacent cavities is substantially equal during normal operation. As shown in FIG. 3, gaps 158 extend axially, and cavity oil leaking laterally through these gaps 158 flows directly and through drain holes 160 to enter a low-pressure space 161 within the housing. From space 161, oil flows through passage 162 back to the sump. The external oil circuit will be described in connection with FIG. 6.

Thus, with the arbor assembly rotating about its axis indicated at 159, its forward end is radially supported by the high-pressure oil circulating in the cavities 154 and gaps 158 and there is no metal to metal contact at surfaces 103 and 104. The foregoing constitutes the front hydrostatic journal bearing in the assembly.

In practice the radial depth of cavities 154 and 163 should be about 50–100 or more the film thickness at gaps 158 and 166 to provide a minimum loss in friction horse power. It is, of course, important to filter the recirculated oil, as to prevent obstructions in the orifices at the cavities, and temperature control is usually provided to assure that the oil remains within reasonable viscosity limits. Also the gaps 158 and 166 usually range between 0.001 and 0.010 inch in thickness and are selected to meet requirements of the application. In this embodiment, 0.002 inch thickness has been selected.

Figure 5:
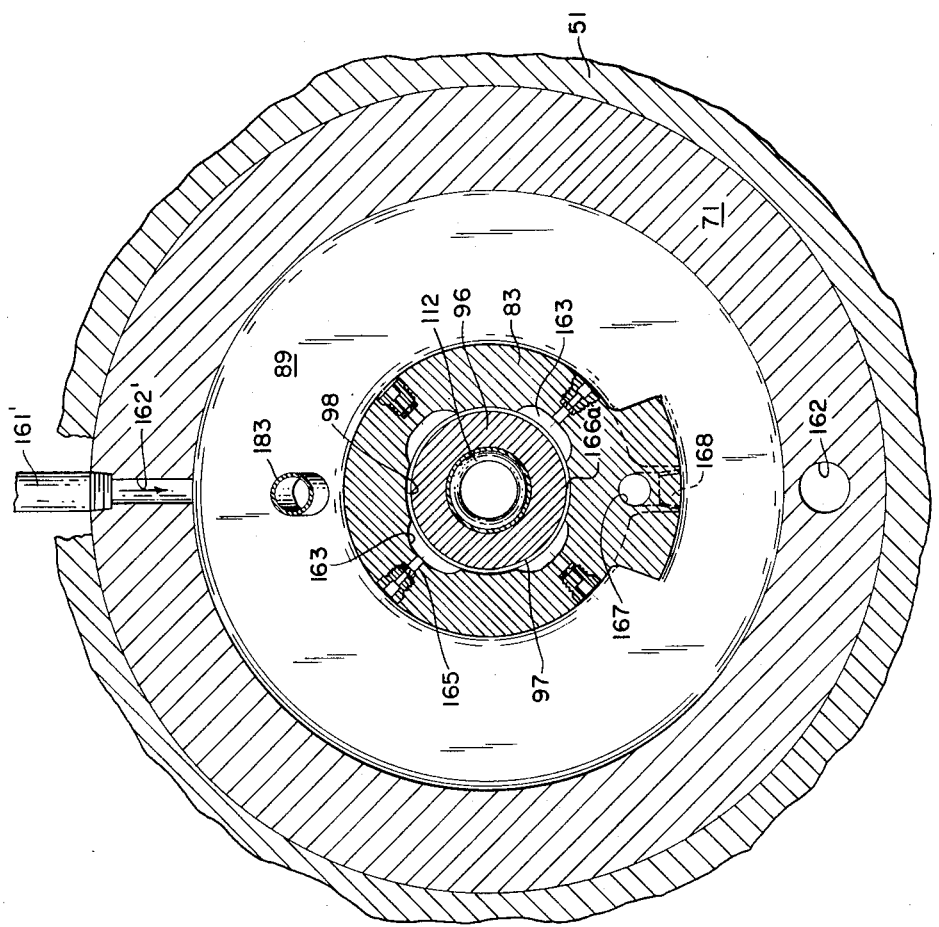
FIG. 5 is a sectional view substantially along line 5—5 of FIG. 3.

Referring to FIGS. 3 and 5, an oil supply conduit 161' enters a housing passage 162' opening into chamber 89. The housing core 83 (FIG. 5) is formed around its internal periphery with a series of spaced cavities 163 each of which is connected to chamber 89 by calibrated accurately sized, restricted sharp-edged orifices 165. Orifices 165 each may be defined by an orifice disc 164 which is held in place by a fitting in a manner similar to that described for orifice 157. Cavities 163 are the same size and equally spaced around the surface 98.

Cylindrical surface 97 is of slightly smaller diameter than internal cylindrical surface 98 of the housing core. The incoming oil maintains high pressure in cavities 163 to provide balanced support of the arbor during rotation. The gaps 166 that exist between concentric surfaces 97 and 98 provide relief passages between the cavities and at the sides as indicated in FIG. 3 to discharge oil into a core passage 167 through which oil flows back to the sump. Communication between passage 167 and chamber 89 is blocked by plug 168.

The foregoing provides a second hydrostatic journal bearing for the arbor assembly.

As shown in FIG. 3, chamber 89 is connected by a core passage 171 to an annular recess 172 in surface 98, and oil from recess 172 flows through a plurality of openings 173 in the arbor to enter piston cylinder 106. Oil under pressure in cylinder 106 forces piston 107 to the left to its workpiece clamping position. Thus oil in the bearing assembly circuit must be pressurized before the workpiece 11 can be secured non-rotatably to the arbor.

An oil supply conduit 181 is connected by a core passage 182 to one end of a conduit 183 extending longitudinally of core 83 to open into a relatively shallow annular chamber 184 defined by annular recess 185 in the rear face of arbor flange 99 and the flat front face 100 of the core. Radially outwardly of chamber 184 the arbor flange is formed with an annular flat face 186 that is closely adjacent and parallel to core face 100 so as to define a restricted passage gap indicated at 187 through which oil from chamber 184 flows to lower pressure passage 162.

Gap 187 functions to provide a thin band of oil between surfaces 100 and 186, thereby providing a rear hydrostatic thrust bearing preventing metal to metal contact between arbor surface 186 and housing surface 100 even under the very heavy axial pressures encountered during friction welding.

Oil under the pressure of cylinder 106 also enters a plurality of radial passages 191, and one or more of these passages 191 is connected by a sharp-edged, calibrated orifice 192 providing a restricted entrance that opens into an annular groove 194. Groove 194 is formed in a fixed ring block 195 secured to the housing by screws 196. Orifice 192, as best shown in FIG. 3A, is defined by a thin orifice disc 193 which is held in place by an annular fitting 193a. Disc 193 is disposed in a short axial passage 193b extending from passage 191 to face 197. Oil under pressure is thus delivered through orifice 192 to the annular interface between the front surface of flange 99 and the housing and this provides a front hydrostatic thrust bearing preventing metal to metal contact between flat annular face 197 on the arbor and flat face 198 on the housing.

Figure 6:
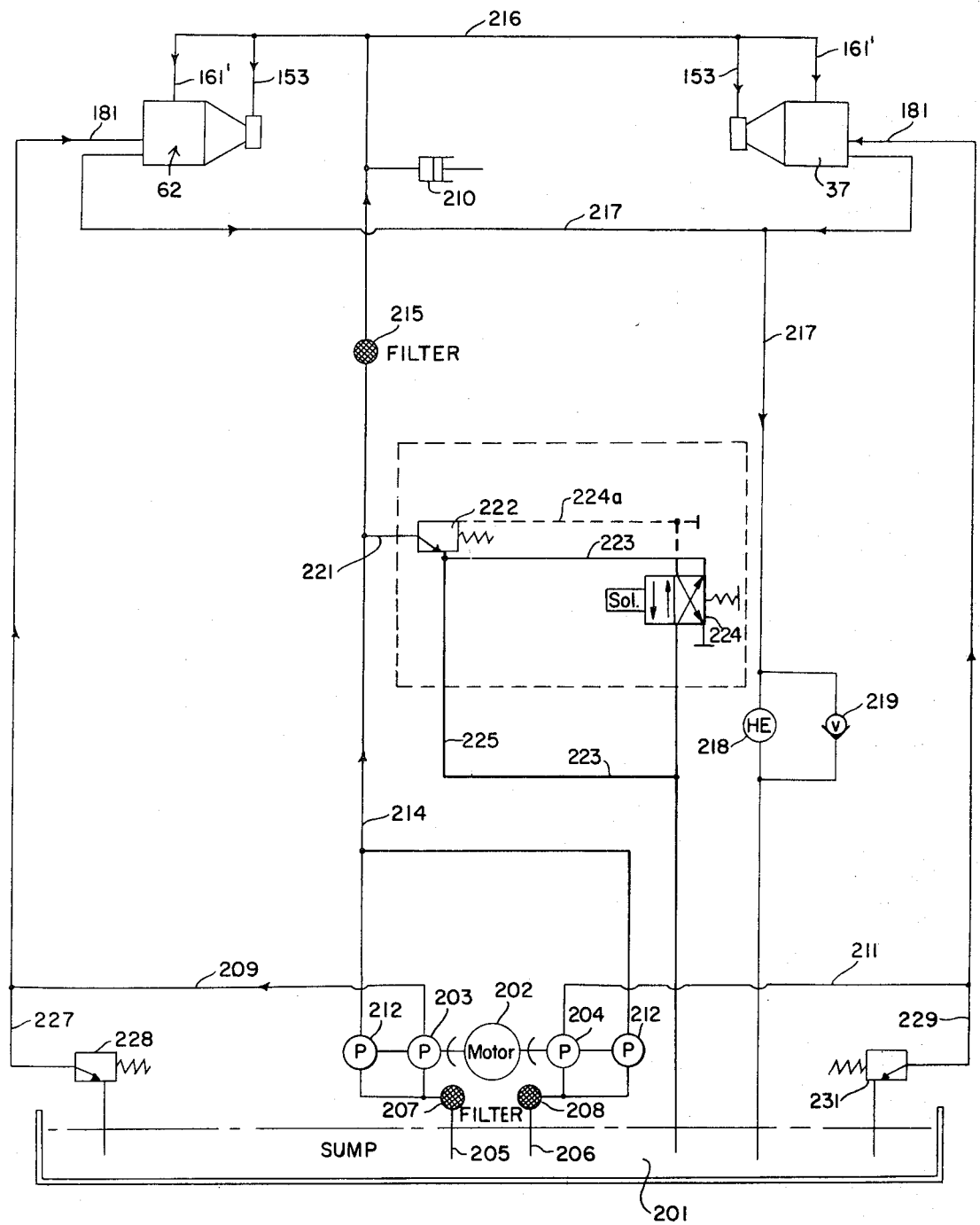
FIG. 6 is a diagrammatic view showing the circuit arrangements for explanation of operation under the invention.

Referring to FIG. 6, the oil sump is indicated at 201. An electric motor 202 drives two similar constant or fixed displacement pumps 203 and 204 to withdraw oil through conduits 205 and 206 and filters 207 and 208 respectively. Pumps of this type, as is well known provide a constant rate of flow.

Pump 203 delivers oil to conduit 209 that is connected to conduit 181. Conduit 181, as shown in FIG. 3, leads into hydrostatic bearing unit cartridge 62 for supplying oil to the rear hydrostatic thrust bearing there. Similarly, pump 204 delivers oil to conduit 211 connected to the conduit 181 leading into hydrostatic bearing cartridge 37 for supplying oil to the rear hydrostatic thrust bearing there. Since pumps 203 and 204 are of the fixed displacement type, the oil pressure at the thrust bearings will be dictated by applied load. The pressure difference across each thrust bearing will depend upon the applied load. The operating thrust bearing oil pressure operating range may vary from 50 to 2,000 psi during operation.

A separate fixed displacement dual pump 212 driven by motor 202 supplies oil to all of the hydrostatic journal bearings. Outlet conduit 214 from pump 212 delivers oil through a filter 215 to a line 216 that connects to both conduits 153 and 161' of both hydrostatic bearing cartridges. Conduit 214 is also connected to a pressure switch 210 which is disposed in the main control circuit for the welding apparatus, and this switch will be open whenever the pressure in line 214 drops slightly below the designed operating pressure. When oil comes up to operating pressure, switch 210 is actuated to allow the welding cycle to be started. Cartridges 37 and 62 have a common drain line 217 connected to passages 162 for returning oil back to the sump after passing through the thrust and journal bearings. A heat exchanger 218 is provided in return line 217 as it is preferable to cool the oil to a suitable temperature for optimum viscosity about 110° F, when passing through the bearings. A check-valved bypass 219 is provided around the heat exchanger, and it will permit return flow of oil should the heat exchanger become blocked.

Since pump 212 is of the fixed displacement type, it, together with relief valve 222, provides a fixed pressure source which is controlled by valve 222, and the pressure differential across orifices 157 and 165 will depend upon the journal load.

A branch line 221 connected to conduit 214 is connected into a relief valve 222 which delivers oil from conduit 214 to line 225 leading directly back to sump 201. This permits a controlled bypass circulation of oil without passing it through the journal bearings and thereby maintains the oil pressure supplied through line 214 at a predetermined magnitude.

As shown in FIG. 6, a four-way, solenoid-operated valve 224 is connected in a conduit 223. Conduit 223 is connected at opposite ends to conduit 225. When the solenoid of valve 224 is de-energized, as when the welding apparatus controls are operated for starting a weld cycle, valve 224 is shifted to its illustrated position to block flow through a vent passage 224a. This allows the oil pressure to build up to a higher limit under the control of valve 222 as compared with the limit that the oil pressure can build up to when valve 224 is shifted to the right where it allows oil to flow through passage 224a to the sump. With the solenoid energized, relief valve 222 bypasses the discharge of pump 212 through conduit 225 at substantially atmospheric pressure. The assembly of valves 222 and 224 is conventional and may be manufactured as a single unit such as the Vickers Co. CT5–06–1A–C20 valve unit. In such a valve unit the pressure in the operative vent passage connection schematically indicated at 224a cooperates with an unshown pilot valve in valve 222 to control the relief valve throttling action. This action and valve construction is more fully described in the Vickers Co. Industrial Hydraulics manual 935100 issued in 1965 by the Machine Hydraulics Division of Vickers Co. and copyrighted by the Sperry Rand Corp. of Troy Michigan.

When the solenoid of valve 224 is de-energized, the pressure in conduit 214 is allowed to build up to a sufficient magnitude to actuate switch 210, allowing the welding cycle to be started. Valve 222 opens sufficiently to prevent the oil pressure from exceeding a suitable operating pressure (such as 1,500 psi). When the solenoid of valve 224 is energized, valve 222 operates to limit the oil pressure to a maximum pressure which is approximately zero psig and which is insufficient to actuate switch 210.

A branch line 227 connects conduits 209 to the pump through a pressure relief valve 228 which opens to limit the maximum pressure in conduit 209 to 2,000 pounds per square inch and re-closes when the pressure drops below that amount. Similarly, a branch line 229 connects conduit 211 to a pressure relief valve 231 for the same purpose. These relief valves 228 and 231 may not be necessary as a practical matter in many installations because of the pressure relief available at the rear hydrostatic thrust bearings where the radial faces 100 and 186 will separate to decrease the oil pressure in inverse proportion to the applied thrust load. Thus, the hydrostatic thrust bearing functions automatically as a relief valve even if relief valves 228 and 229 are omitted. However inclusion of those relief valves will prevent scoring and failure of the thrust bearing in the event its rated maximum thrust capacity is inadvertently exceeded.

OPERATION

In operation the workpiece 12 is placed in stationary cradle 14 and clamped by jaws 15, 16, 18 and 19. The workpieces 11 and 13 are inserted into the open ends of the hydrostatic bearing cartridges, pistons 107 at this time being displaced into the forward positions as to the right in FIG. 3 by springs 112 so that chuck elements 121 have been forwardly displaced to loosely axially receive the workpieces. At this time the end faces of the workpieces to be friction welded together are axially aligned.

Now the control system for the welding machine is energized. This system is disclosed and claimed in detail in my copending U.S. application Ser. No. 650,396, now U.S. Pat. No. 3,548,487, issued Dec. 22, 1970 for Method and Apparatus For Friction Welding filed on even date herewith and no detailed reference to it is here believed to be needed except to state that motor 202 runs continuously during and between welding cycles and is thus operating when motors 46 and 67 are started and drive connected to rotate spindles 11 and 13 in the welding cycle.

Oil under pressure (about 1,500 psi) is delivered to line 216 and therefrom to all four hydrostatic journal bearings. With reference to FIG. 3, the oil at line pressure from conduit 153 and passage 152 enters groove 151 which circulates it to simultaneously pass through the restricted orifices 157 into cavities 154, so that all six cavities 154 solidly contain bodies of oil under pressure. Oil from the cavities also flows continuously back to drain through gaps 158 into passage 162.

The arbor assembly at the front end is therefore peripherally supported entirely by the pressurized oil bodies in cavities 154 out of metal to metal contact with internal surface 104 of the housing. The equal pressure areas at the cavities cooperate to automatically center the arbor assembly on its axis of rotation, and the arrangement prevents increasing radial loads on the arbor assembly from causing metal to metal contact between the arbor assembly and housing. For example, should the radial load on the arbor assembly increase at the top in FIG. 4, this will result in the arbor assembly being displaced downwardly which will reduce the separation of surfaces 103 and 104 at the lower gaps 158 and increase the separation of those surfaces at the upper gaps. As a consequence the relief through gaps 158 between the lower cavities will be restricted to result in the oil pressure in the adjacent cavities increasing, and the widened upper gaps 158 permit increased relief and therefore lower oil pressure in the upper cavities. This condition prevails as long as there is an unbalanced load on the bearing. The increase in oil pressure, as at the bottom cavities in the foregoing example, when algebraically added to the decrease in oil pressure at the upper cavities will equal the applied load. The foregoing action is rendered possible due to the provision of the restricted orifices through which oil enters the cavities as these orifices isolate the cavities from the pressurized source sufficiently to enable compensation to take place. When the arbor assembly becomes centered on the axis of rotation, all cavities are equally pressurized.

Oil from lines 216 and 161' enters passage 162' to provide an annular body of oil in chamber 89 at pump pressure, and this chamber simultaneously supplies oil through all of the restricted orifices 165 into the cavities 163, whereby these cavities contain oil under pressure and are interconnected by circumferential gaps 166a (FIG. 5). Surfaces 97 and 98 are automatically maintained against metal to metal contact as described for the front bearing. Oil from cavities 163 continuously flows through the sides of gaps 166 to the drain passage 162.

Thus it will be seen that the entire arbor assembly is radially supported and automatically centered by the front and rear hydrostatic journal bearings in each cartridge. The combination of hydrostatic journal bearings with the components of a machine subject to such exceptionally large loads as friction welding apparatus is particularly novel and useful, because bearings of the usual tapered roll or ball type designed to withstand equivalent forces would be exceptionally large and unwieldy, difficult to mount and of such large weight and inertia as to require excessive forces to move and stop the large masses involved. The provision of hydrostatic bearings in the combination reduces the sizes of the workpiece carriers to unexpectedly small dimensions and provides better practical operational conditions within smaller space at less expense, and this contributes mainly to solve the problems of adapting friction welding to the joining of heavy large components.

Referring to FIG. 3, it will be seen that the hydrostatic journal bearings are disposed forwardly and rearwardly of the hydrostatic thrust bearings provided between the arbor assembly flanged section 99 and the housing. The novel cartridge unit of the invention contains only two oil seals between the entire rotating arbor assembly and the housing, which is extremely advantageous in view of the high speeds involved, and those seals are the end seals at 134 and 144 which are located so as to be subject only to oil at reduced pressure flowing away from the radial bearings. This aspect of the invention thus provides few seals and facilitates convenient repair of replacement by locating the seals at opposite ends of each carrier unit.

Since passage 171 conducts oil under pressure from chamber 89 to the cylinder 106, chuck elements 121 are displaced rearwardly in FIG. 3 to automatically clamp the workpiece 11 fixedly to the arbor assembly only when the radial bearings have been pressurized, and this takes place before the arbor assembly is rotated during the welding machine cycle. When the oil pressure drops in chamber 89 during the welding machine cycle, as when the solenoid for valve 224 is energized, the pressure in cylinder 106 drops to allow spring 112 to push the chuck elements forward to release the workpiece. By making core 83 as a separate housing part for insert in the assembly, machining and other forming of the oil passages and surfaces therein is simplified and may be carried out apart from the housing 71.

Pumps 203 and 204 simultaneously deliver oil through conduits 181 and 183 into the rear hydrostatic thrust bearings of the respective cartridges under a variable pressure depending upon the magnitude of the imposed thrust load.

Referring to FIG. 3, it will be seen that chamber 184 contains an annular band or pad of oil, and oil from chamber 184 passes continuously radially out in an annular thin layer in the gap 186 between surfaces 185 and 100 to discharge into drain passage 162 which delivers the oil back to sump 201.

The arbor assembly 95 is so mounted in the apparatus as to have a predetermined range of controlled small axial float in the housing. The allowable degree of float is such that, with zero thrust (no axial load) which is the condition that exists before the workpieces 11 and 13 engage the ends of workpiece 12, oil pressure in chamber 184 urging the arbor assembly forwardly increases gap 187 to such width that the pump pressure falls to only about five percent of its maximum value. This automatic relief means that little power is consumed and the apparatus is free of high-pressure oil strain except when actually performing the welding operation during each cycle.

It is a noteworthy feature of the invention that the high pressure oil circuit within each cartridge requires no oil seals within the cartridge. The only oil seals at 134 and 144 need withstand lower oil pressures.

The annular land 172a (FIG. 3) in surface 98 effectively isolates the rear or outboard hydrostatic journal bearing from the higher pressure oil in the thrust bearing circuit, the space between surfaces 97 and 98 extending between chamber 184 and groove 172 providing a very low leakage seal between the two oil circuits within the cartridge.

A hydrostatic reverse thrust bearing is provided at the front side of flange section 99 of the arbor assembly, where oil at the pressure of piston chamber 106 is discharged through the series of circumferentially spaced restricted orifices 192 to throttle at lower pressure into annular groove 194, and this lower pressure is adequate to always maintain flange section 99 of the arbor assembly from metal to metal contact with the housing.

When the pressurized oil circuits in the radial journal bearings have been established, when the power units 45 and 65 are actuated to drive the arbor assemblies, and when the arbor assemblies are up to speed, the respective cylinders at 32 and 33 and 54 and 55 are operated to slide carriers 22 and 23 toward each other to frictionally engage the workpieces. Once these are engaged the journal and thrust loads, particularly the latter, increase tremendously. The automatic compensation at the journal bearings has been above described.

As the thrust increases the entire arbor assembly will tend to shift rearwardly relative to housing 71, to the left in FIG. 3. This does not cause any oil leakage at the end seals 134 and 144 because these seals are axially resilient and the oil pressure there is relatively low, and seal 144 axially expands to maintain sealing engagement with the housing. Rearward displacement of the arbor assembly results in restriction of the annular gap 187 between the flat parallel surfaces 100 and 186, to decrease the relief from chamber 184, and this results in oil pressure building up between pumps 203 and 204 and the respective chambers 184. The pumps are of such capacity as to be capable of developing counter pressures opposing the thrust up to 2,000 psi in chamber 184, which in a friction welding apparatus for welding spindles onto axle housings is adequate to oppose axial thrust up to 150,000 pounds at the welding joint.

The invention is particularly effective in heavy duty friction welding apparatus wherein the welding cycle involves periods where full capacity of the thrust is developed at zero speed. The weld under the applied axial pressure develops immediately after rotation of the end workpieces 11 and 13 is stopped. Hydrostatic bearings as disclosed maintain adequate film thickness layers of lubricant at the gaps 158, 166 and 187 under the very heavy load low speed conditions encountered. As a result of the pressurized oil support conditions provided by the hydrostatic bearings there is little or no bearing starting friction to overcome when the motors 46 and 67 are set in operation and minimum power is required for accelerating the rotating workpieces, and operational speeds are quickly attained even for such heavy masses as axle housing components, which speeds operation and increases production.

It is also to be noted that the pressure of oil supplied to the thrust bearings varies with the imposed axial load from a small value approaching zero to a much greater value, with the upper limit being appreciably higher than the fixed supply of pressure to the journal bearings.

As shown in FIG. 3, the front hydrostatic journal bearing defined by cavities 154 and gaps 158 circumferentially surrounds the chuck element workpiece gripping surfaces. This provides for a workpiece journal support of appreciable hydraulic stiffness and great load carrying capacity and minimizes the movement arm of the journal support so that the workpiece 11, when rotating, will not whip to any significant degree.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A hydrostatic bearing unit for friction welding apparatus comprising a housing, an arbor assembly extending through said housing and having means for clutching a workpiece thereto, spaced hydrostatic journal bearings rotatably mounting said arbor assembly on said housing, and means mounting said arbor assembly for controlled limited axial float on said housing comprising hydrostatic thrust bearing means comprising opposed adjacent axial surfaces on said housing defining an annular recess at said surfaces, means for introducing liquid under pressure into said recess, and means defining an annular gap between said surfaces peripherally outwardly of said recess for restricted discharge of liquid from said recess, one of said thrust surfaces being supplied with fluid from an independent fixed displacement source while the other of said thrust surfaces being supplied from another source through at least one compensating orifice.

2. The hydrostatic bearing unit defined in claim 1, wherein said thrust bearing means comprises a main hydrostatic thrust bearing opposing axial displacement of said arbor assembly during the friction welding operation, and a reverse thrust hydrostatic bearing opposing displacement of the arbor assembly in the opposite direction.

3. The hydrostatic bearing unit defined in claim 2, wherein said thrust bearings are disposed between axially spaced portions of said housing and opposite sides of a radial flange on said arbor assembly.

4. The hydrostatic bearing unit defined in claim 1, wherein each of said journal bearings comprises an annular housing chamber connected to a source of liquid under pressure, a circumferentially spaced plurality of cavities in an inner cylindrical surface of said housing extending around a cylindrical surface on said arbor assembly, and means providing a plurality of restricted orifice passages between said chamber and all of said cavities, said surfaces being spaced as to provide restricted gaps through which liquid is adapted to be discharged from said cavities at low pressure.

5. The hydrostatic bearing unit defined in claim 4, wherein said arbor assembly contains a cylinder in which is slidable a piston operatively connected to said clutching means, and a passage from one of said annular housing chambers to said cylinder for introducing fluid pressure into said cylinder to displace said piston to actuate said clutching means when fluid under pressure is supplied to the radial bearings.

6. The hydrostatic bearing unit defined in claim 4, wherein said thrust bearing means comprises a main hydrostatic thrust bearing between the housing and arbor assembly and a reverse thrust hydrostatic bearing between the arbor assembly and the housing, means comprising at least one calibrated orifice for introducing fluid under pressure from one of said annular housing chambers into said reverse thrust bearing, and means for introducing fluid from a fixed displacement source into said main thrust bearing.

7. The hydrostatic bearing unit defined in claim 1, means providing axially resilient seals between said arbor assembly and said housing at opposite ends of said arbor assembly for maintaining fluid tight sealing of said arbor assembly with said housing regardless of axial shift of said arbor assembly.

8. The hydrostatic bearing unit defined in claim 1, wherein said housing comprises an outer part formed with a recess open at one side, an insert core fixed in said recess and formed with a peripheral groove to provide an annular chamber within the housing, said core having a cylindrical surface closely surrounding a cylindrical surface on the arbor assembly and there being a plurality of cavities circumferentially distributed about said core surface and a corresponding plurality of restricted orifices connecting said chamber to said cavities, a flange on said arbor assembly having on one side a recessed surface facing an end of said insert core and parallel annular surfaces on said core and flange peripherally outwardly of the recess in said flange surface defining a restricted gap through which fluid is discharged from said recess to define a main hydrostatic thrust bearing, and a thrust bearing between the other side of said flange and an adjacent part of the housing.

9. A hydrostatic bearing system for an axially displaceable, housing-mounted member comprising first and second hydrostatic thrust bearing means for respectively absorbing loads applied in axially opposite directions with respect to said member, fixed displacement pump means providing a first source for supplying hydraulic fluid at a substantially constant flow rate to said first bearing means regardless of the magnitude of the load imposed thereon, means independent of the fluid supplied by said first source for providing a substantially constant pressure hydraulic fluid source and means including orifice means providing fluid communication between said constant pressure hydraulic fluid source and said second bearing means to deliver hydraulic fluid to said second bearing means.

10. The hydrostatic bearing system defined in claim 9 comprising hydrostatic journal bearing means for rotatably supporting said member, and further fixed displacement pump means supplying hydraulic fluid to said journal bearing means and providing said constant pressure hydraulic fluid source.

* * * * *